G. HUHN.
PACKING FOR STEAM TURBINES.
APPLICATION FILED MAY 19, 1910.

976,369.

Patented Nov. 22, 1910.

2 SHEETS—SHEET 1.

Witnesses
C. R. Hardy
C. H. Griesbauer

Inventor
Gustav Huhn
by H. B. Willson & Co.
Attorneys

G. HUHN.
PACKING FOR STEAM TURBINES.
APPLICATION FILED MAY 19, 1910.
976,369.
Patented Nov. 22, 1910.
2 SHEETS—SHEET 2.
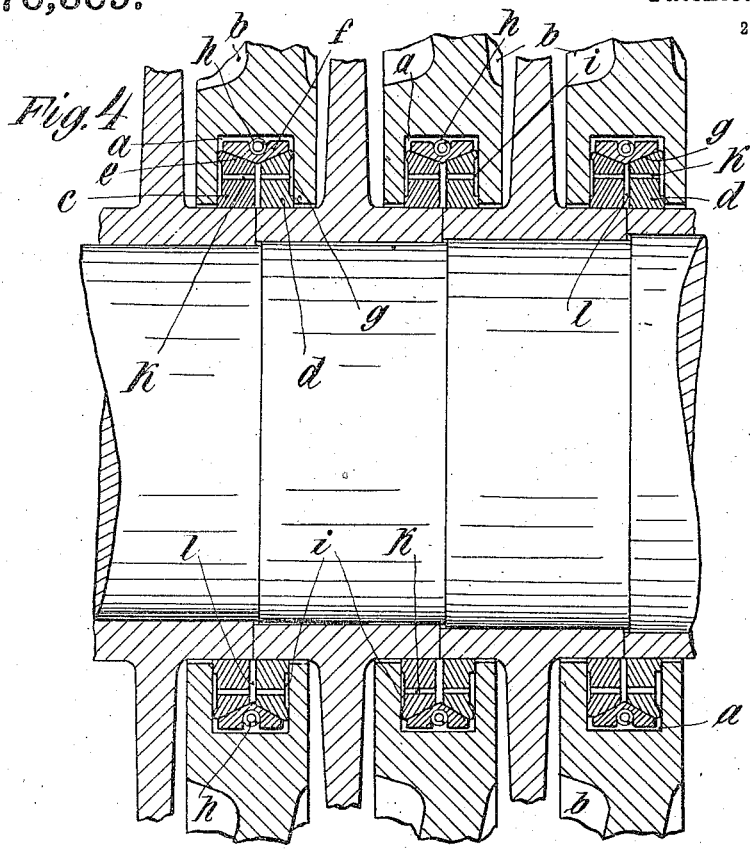
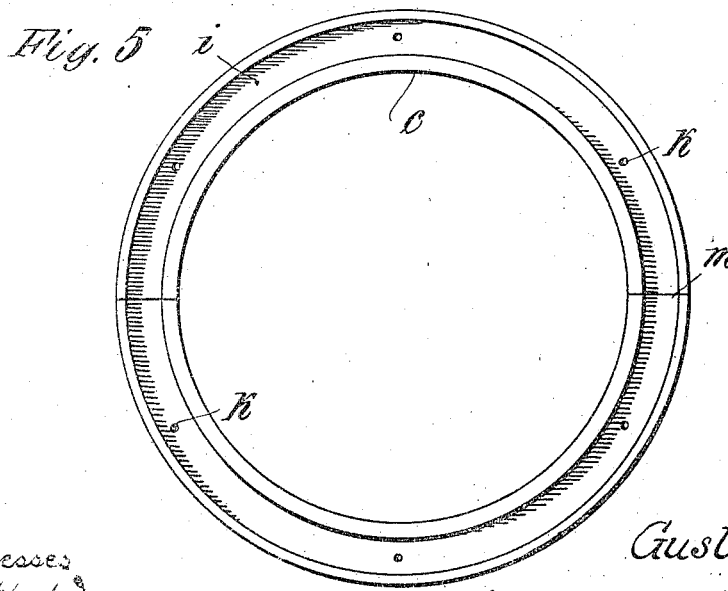
Witnesses
Inventor
Gustav Huhn
by H. B. Willson & Co.
Attorneys

UNITED STATES PATENT OFFICE.

GUSTAV HUHN, OF BERLIN, GERMANY.

PACKING FOR STEAM-TURBINES.

976,369.  Specification of Letters Patent.  Patented Nov. 22, 1910.

Application filed May 19, 1910. Serial No. 562,306.

*To all whom it may concern:*

Be it known that I, GUSTAV HUHN, manufacturer, citizen of Germany, subject of the King of Prussia and Emperor of Germany, residing at Berlin, in the Kingdom of Prussia and Empire of Germany, have invented new and useful Improvements in Packing for the Chamber-Walls of Steam-Turbines and the Like, of which the following is a specification.

My invention relates to packing the chamber walls of steam turbines and the like on the shaft, and a primary object is to relieve the latter from the weight of the packing rings.

My invention consists primarily in divided packing rings, which closely surround the turbine shaft, not being pressed against the shaft but by wedges against the side walls of annular grooves in the walls of the chambers. Consequently, the packing rings do not load the rotating shaft itself and, as they are able to participate in the radial movements of the shaft, are not materially ground in its rotation, so that they are able to fulfil their purpose for a long time.

As wedges for pressing the packing rings against the side wall of the turbine casing or shell divided rings of substantially triangular section are preferably used which are pressed by springs against the packing rings surrounding the shaft.

Some illustrative embodiments of my invention are represented by way of example in the accompanying drawing, wherein:—

Figure 1:
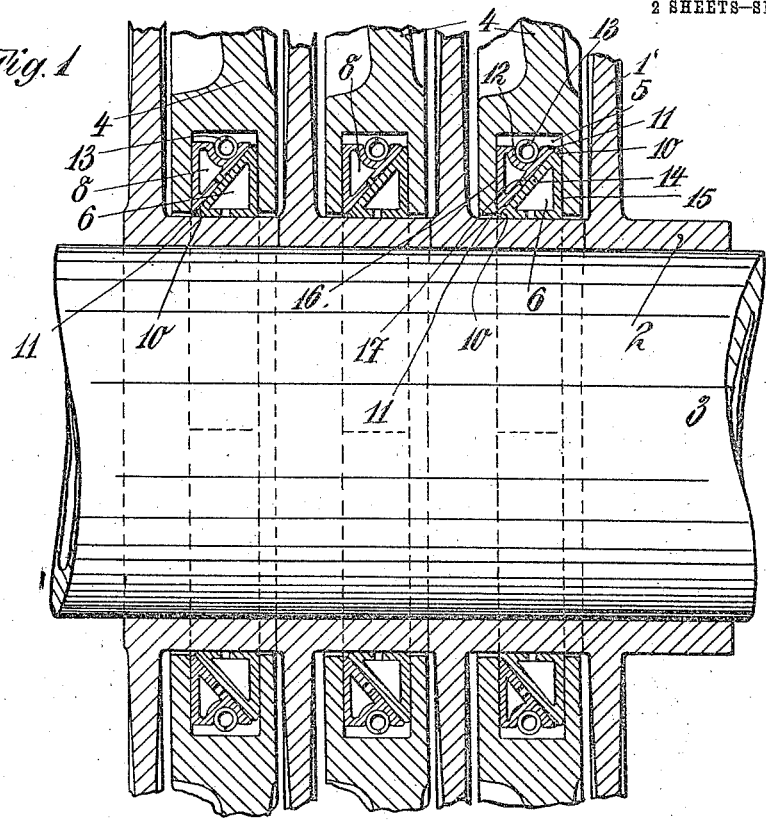
Figure 3:
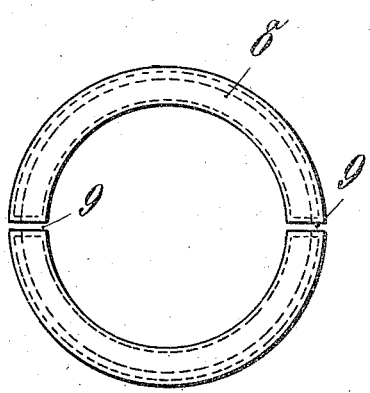
Figure 2:
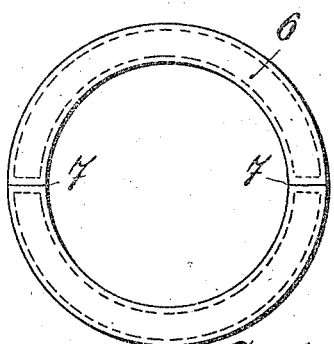

Figure 1 is an elevation of one embodiment showing a portion of a turbine shaft with the central parts of some blade wheels and diaphragms in section, Fig. 2 is an elevation of a divided packing ring, and Fig. 3 is an elevation of a divided wedge-shaped ring, while Fig. 4 shows another embodiment in section, and Fig. 5 is a side elevation of a divided packing ring employed in the latter embodiment.

Referring firstly to Figs. 1 to 3, the sleeves or flanges 2 of the blade wheels or rotors 1 completely surround the shaft 3 on which they are keyed. The diaphragms 4 are provided with annular grooves 5 in the parts surrounding the sleeves 2.

Packing rings 6 are placed in each groove 5. In this illustrative embodiment these rings each comprise two half rings (Fig. 2) of substantially triangular section which are composed of hard metal, are made hollow and filled with a lubricant. The metal rings 6 are ground exactly to fit on the sleeves 2 and are of such a size that the end faces of the half rings closely contact one another so that the half rings abut against one another tightly at the joints 7 (Fig. 2).

In the illustrative embodiment the wedges 8 also comprise half rings of substantially triangular section which fit on the rings 6. But in contradistinction to the half packing rings the end faces of the half wedge-shaped rings do not perfectly contact one with another, but on the contrary the two halves of a ring are located some distance apart so that a free space 9 is left between them (Fig. 3). As seen from Fig. 1, neither the packing rings 6 nor the wedge-shaped rings 8 completely fill the breadth of the hollow packing chamber and for this purpose are rounded off at the pointed edges 10, 11. Also, in the vertical direction the hollow packing chamber is not completely filled by the packing and wedge-shaped rings, so that the entire system can participate in possible movements to and fro of the shaft and rotors.

The wedge-shaped rings 8 are provided outside with annular grooves 12. In each of these is placed a spiral spring 13 which embraces the two halves of the wedge-shaped ring and presses the wedge-shaped ring against the packing ring 6. In consequence of this pressure the faces 14 of the wedge-shaped rings 8 tend to slide inward on the slanting faces of the packing rings 6 and press the latter against the side wall 15 of the annular groove 5, while their side faces 16 press against the opposite wall of the groove 5. In this manner a strong wedge pressure is brought about; the packing rings are not pressed, as usual, against the shaft or the sleeves rotating with it, but against the side wall of the stationary annular grooves of the chamber walls, and do not load the shaft or the sleeves, so that their grinding is substantially avoided, and owing to their pressing against the side walls they completely prevent steam entering into the chambers.

In the illustrative embodiment the outer wedge-shaped rings are also hollow and filled with a lubricant. They are provided in the faces 14 with outlets 17 for the lubricant, so that the wedge faces are lubricated, whereby the wedge action can be increased still more.

When employed in steam turbines there is the danger that steam which penetrates into the chamber or stuffing box can exercise a pressing action on the rings from outside the wedge-shaped rings in the same direction as the springs surrounding the wedge-shaped rings, and thus materially increase the desired pressure exercised by the springs. As it is generally a matter of high-pressure steam, the packing rings are then pressed in this manner by the wedges with exceptional force against the side walls of the chambers, so that they are not able to move at all and consequently cannot yield when the shaft oscillates laterally. This can be avoided by relieving the rings from the pressure of the steam which possibly enters into the chambers or stuffing boxes, so that the rings are pressed against the side walls of the chambers substantially only by the pressure exercised by the springs on the wedges. To this end, cavities or recesses are preferably provided in the contacting faces between the side walls of the chambers and the rings pressed against them, into which recesses the steam entering into the chambers can penetrate. In these recesses the steam which has entered exercises a counter-pressure which tends to press the rings away from the walls of the chambers. When these recesses or the pressure faces for the steam in them are suitably dimensioned it can be arranged, without further ado, that by means of this counter-pressure the pressure which is exercised by the steam and tends to press the rings against the side walls of the chambers is entirely or approximately completely negatived, so that the rings are pressed against the walls of the chambers substantially only under the action of the springs surrounding the wedges. Preferably the arrangement is such that the wedge is given a fairly slight slope, so that its action is only a moderate one, and, further, in each chamber are provided two divided, transversely-perforated rings provided outside with slanting faces and having annular grooves in the sides, which rings are pressed apart and against the side walls of the chambers by a wedge-shaped ring provided inside with two slanting faces, so that the transverse holes in the rings open into the gap formed between the two owing to their being pressed apart. An illustrative embodiment of my invention in accordance herewith is represented in Figs. 4 and 5.

Referring to these figures, in each of the annular grooves $a$ of the diaphragms $b$ two packing rings $c$ and $d$ each comprising two half rings (Fig. 5) are placed. In this illustrative embodiment the rings are of substantially rectangular section and are provided on the outside with slanting faces $e$. The wedge-shaped ring $f$ which is pentagonal in section possesses inside two corresponding slanting faces $g$, so that one single wedge-shaped ring $f$ presses the two divided rings $c$ and $d$ of one chamber under the action of the spring $h$ against the side walls of the chamber.

The rings $c$ and $d$ are provided in their side faces with annular grooves $i$ and these grooves are connected by narrow holes or channels $k$ with the gap $l$ which is formed between the rings $c$ and $d$ by these rings being pressed away from the center under the action of the wedge-shaped ring $f$.

When steam enters into the chambers, it is able to penetrate through the joints $m$ (Fig. 5) between the half rings into the gap $l$ and hence through the holes $k$ into the annular grooves $i$. Thus while steam tends to press the rings $c$ and $d$ against the side walls of the stuffing-box chamber on the one hand from the gap $l$ or from the outside of the wedge-shaped rings $f$, the steam which has entered through the holes $k$ into the recesses $i$ acts opposite to it and tends to press the rings from the side walls of the chamber toward the center. In this manner it is possible, when the annular grooves $i$ are dimensioned correspondingly, substantially to negative the action of the steam pressure on the packing rings, so that these are pressed against the side walls of the chambers only under the action of the springs which press on the wedges. Owing to the slope of the wedge faces being fairly slight, it is obtained simultaneously that, if excess steam-pressure possibly acts on the outside of the wedge rings, the packing rings are not pressed too severely against the side walls of the chambers and thus maintain their movability in a radial direction.

The transverse holes $k$ in the packing rings serve simultaneously an additional special purpose in assembling, and are therefore so arranged that the holes of the rings $c$ and $d$ of a chamber are opposite one another, in other words register one with another. When assembling the packing, threads of material which can be destroyed by the action of steam, such as catgut, artificial silk, artificial horse-hair and the like, are drawn through these holes in the two rings after these rings have been joined together in the desired position with the wedge-shaped ring and the spring. The half rings $c$ and $d$ are held firmly by these threads with the appertaining part of the wedge-shaped ring $f$ and can thus be readily placed into their chamber or stuffing-box. Then, as soon as steam is sent through the chamber, the threads break, the wedges can operate and press the rings $c$ and $d$ against the walls of the chamber.

It is possible to modify the described embodiments in manifold ways. For example, the recesses in the contacting faces between the chamber walls and the rings pressed against them may be provided in the chamber walls instead of in said faces; the pressure faces of these recesses meant for the steam do not require to be vertical; the holes through which these recesses are connected with the space in the chambers filled with steam may run in another direction, and so on. The wedges and packing rings may have other shapes instead of those shown and also the steepness of the wedge faces may be changed.

Having now described my invention what I claim and desire to secure by Letters Patent of the United States is:

1. In a packing for the chamber-walls of steam-turbines and the like the combination of divided packing-rings closely surrounding the shaft or the like of the turbine, said packing-rings being arranged in annular grooves of the chamber-walls, wedges within said grooves for pressing said rings against the side walls of the grooves, springs surrounding said wedges within said grooves, said springs working in a direction against the shaft of the turbine.

2. In a packing for the chamber-walls of steam-turbines and the like the combination of divided packing-rings closely surrounding the shaft or the like of the turbine, said packing-rings being arranged in annular grooves of the chamber-walls, wedge-shaped divided rings surrounding said packing-rings within said grooves, the single parts of said divided wedge rings not touching with another, a spiral spring surrounding said wedge rings within said grooves, said grooves and packing systems being so dimensioned, that the packing system with the wedge ring and spring does not perfectly fill the groove.

3. In a packing for the chamber-walls of steam-turbines and the like the combination of divided packing-rings closely surrounding the shaft or the like of the turbine, said packing-rings being arranged in annular grooves of the chamber-walls, wedges within said grooves for pressing said rings against the side walls of the grooves, springs for said wedges within said grooves, recesses being provided at the contacting faces between the side walls of said annular grooves or chambers and the packing-rings pressed against them.

4. In a packing for the chamber-walls of steam-turbines and the like the combination of divided packing-rings closely surrounding the shaft or the like of the turbine, said packing-rings being arranged in annular grooves of the chamber-walls, wedges within said grooves for pressing said rings against the side walls of the grooves, springs for said wedges within said grooves, recesses being provided in the side faces of said packing-rings pressed against the side-walls of said annular grooves.

5. In a packing for the chamber-walls of steam-turbines and the like the combination of divided packing-rings closely surrounding the shaft or the like of the turbine, said packing-rings being arranged in annular grooves of the chamber-walls, wedges within said grooves for pressing said rings against the side walls of the grooves, springs for said wedges within said grooves, recesses being provided at the contacting faces between the side walls of said annular grooves or chambers and the packing-rings pressed against them, narrow transverse holes within said packing-rings and communicating with said recesses.

6. In a packing for the chamber-walls of steam-turbines and the like an annular groove within said chamber-wall, two divided packing-rings closely surrounding the shaft or the like and being arranged side by side within said annular groove, recesses in the side faces of said packing-rings and transverse holes within said rings and communicating with said recesses, a divided wedge-shaped ring surrounding said pair of packing-rings and pressing them apart from each other and against the side walls of the annular groove, a spring surrounding said wedge-shaped ring within said groove.

7. In a packing for the chamber-walls of steam-turbines and the like an annular groove within said chamber-wall, two divided packing-rings closely surrounding the shaft or the like and being arranged side by side within said annular groove, recesses in the side faces of said packing-rings and transverse holes within said rings and communicating with said recesses, the transverse holes of both said rings registering with one another, a divided wedge-shaped ring surrounding said pair of packing-rings and pressing them apart from each other and against the side walls of the annular groove, a spring surrounding said wedge-shaped ring within said groove.

In testimony whereof I have hereunto set my hand in presence of two subscribing witnesses.

GUSTAV HUHN.

Witnesses:
HENRY HASPER,
WOLDEMAR HAUPT.